(12) United States Patent
Sandré

(10) Patent No.: US 6,498,848 B1
(45) Date of Patent: Dec. 24, 2002

(54) USE OF AN ECHO CANCELLER FOR THE DETECTION OF CAS SIGNALS

(75) Inventor: Benoît Sandré, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/154,371

(22) Filed: Sep. 16, 1998

(30) Foreign Application Priority Data

Sep. 17, 1997 (FR) .............................. 97 11581

(51) Int. Cl.[7] .......................... H04M 3/00; H04M 11/00
(52) U.S. Cl. ............... 379/373.01; 379/373.02; 379/373.03; 379/373.04; 379/373.05; 379/386; 379/90.01
(58) Field of Search ................. 379/373, 386, 379/406, 90.01, 373.01–373.05

(56) References Cited

U.S. PATENT DOCUMENTS 5,680,447 A * 10/1997 Diamond et al. ........... 379/215
5,974,138 A * 10/1999 Sambhwani et al. ........ 379/373
5,995,611 A * 11/1999 Mowafy et al. ............ 379/215
6,269,160 B1 * 7/2001 Bartkowiak ................ 379/386

FOREIGN PATENT DOCUMENTS

JP          08214055 A      8/1996      ............ H04M/1/57

* cited by examiner

Primary Examiner—Forester W. Isen
Assistant Examiner—Ramnandan Singh
(74) Attorney, Agent, or Firm—Dicran Halajian

(57) ABSTRACT

A method and a communication device detect a service signal and include a converter having a first input which is connected to a communication channel for communicating with a network. An input device is connected to a second input of the converter for providing input signals to the converter. An echo canceller receives the input signals to form a replica of echo present in output signals from the converter for cancelling the echo and forming modified output signals. An output device is connected to an output of the echo canceller for receiving the modified output signals, and a service signal detector is connected to the output of the echo canceller.

11 Claims, 1 Drawing Sheet

USE OF AN ECHO CANCELLER FOR THE DETECTION OF CAS SIGNALS

FIELD OF THE INVENTION

The invention relates to telephony equipment having:

an input for receiving useful signals to be transmitted on an outgoing transmission channel, and an output for delivering useful signals received on a return transmission channel, said outgoing and incoming transmission channels being coupled to a telephone line by coupling means, a service signal detector for detecting service signals transmitted by a telephone exchange on the telephone line and which may be superposed on useful signals.

The invention also relates to a detection method of detecting service signals transmitted to such telephony equipment by a telephone exchange, said service signals which may be superposed on useful signals.

The invention finds interesting applications in the field of telephone transmissions, for example, for implementing services such as the call signal for informing a user who is already on the line that someone else tries to contact him.

BACKGROUND OF THE INVENTION

Recommendation ETS 300 778-1 by the ETSI (European Telecommunications Standard Institute) notably describes the procedure which is implemented for this purpose between a called party and the telephone exchange on which he depends. This procedure is summarized in FIG. 1. When the telephone exchange 1 receives a call having the called party 2 for its destination, it sends a service signal named CAS (Call Alert Signal) onto the telephone line 3. The called party 2 detects this signal, cuts off the audio channels and sends a DTMF (Dual Tone Multi Frequency) digit "D" to the telephone exchange 1. Upon reception of this DTMF "D", the telephone exchange 1 sends the co-ordinates of the calling party (name, telephone number . . . ) to the called party via FSK (Frequency Shift Keying) modulation. Thereafter, the running telephone communication is re-established.

Japanese patent abstract no. 08214055 notably describes a telephone receiving circuit suitable for operating in a CAS detection mode and in an FSK detection mode for implementing such procedure.

The essential problem posed for the detection of service signals, notably CAS signals, is the following. When the service signal is likely to be superposed on other signals, it is necessary to utilize less stringent detection criterions (notably the criterions relating to frequency, duration, signal level . . . ) to ensure the detection thereof whatever the level of these other signals. But when less stringent criterions are used, one runs the risk of false detections, that is to say, detections of service signals in a useful signal (somebody's voice in the case of a CAS service signal).

SUMMARY OF THE INVENTION

It is an object of the invention to propose telephony equipment and a service signal detection method which provide an efficient solution to this problem.

For this purpose, a telephone according to the invention and as defined in the opening paragraph is characterized in that it comprises an echo canceller for cancelling the echo of useful signals coming from said input which come back on said output, the service signal detector being connected between the echo canceller and said output at least when the telephony equipment is on-line.

Similarly, a service signal detection method according to the invention and as described in the opening paragraph is characterized in that it comprises the use of an echo canceller for cancelling the echo of the useful signals coming from said input which come back on said output, and carrying out said detection on the signals produced on the output of the echo canceller.

Thus, the service signal detector neither receives the signals sent by the parties nor the echo of the signal sent by the called party which comes back on the return channel when said coupling means and the telephone line are not properly adapted as regards impedance. The detection criterions used may thus be more stringent which diminishes the risk of false detections and considerably improves the reliability of the system.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

The invention will now be described in the case of a telephone including a CAS signal detector. The invention is certainly not restricted to this example. The invention is applied to the detection of any service signal which may be superposed on useful signals and to any type of telephony equipment, notably corded or cordless telephones, analog or digital telephones.

Figure 1:
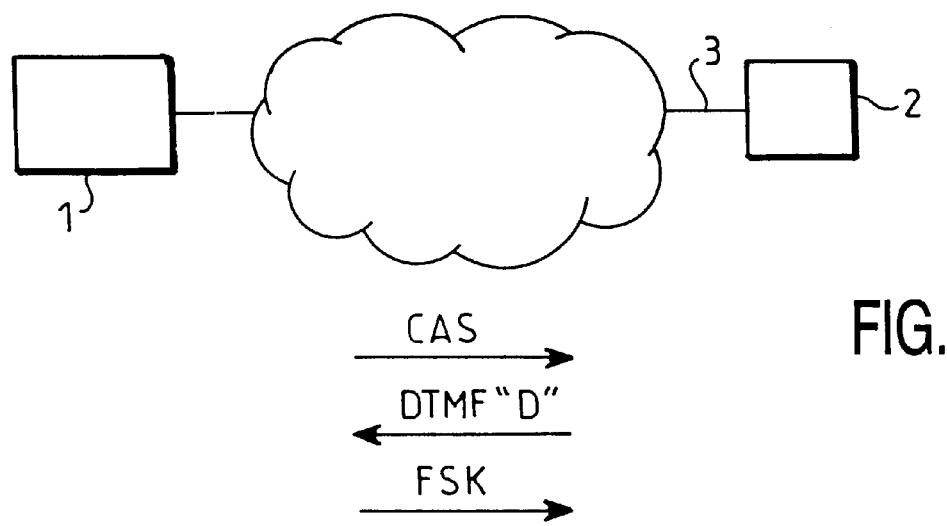
FIG. 1 gives a summary of the procedure which is implemented between the telephone exchange and the telephony equipment called for the implementation of a call signalling service.
Figure 2:
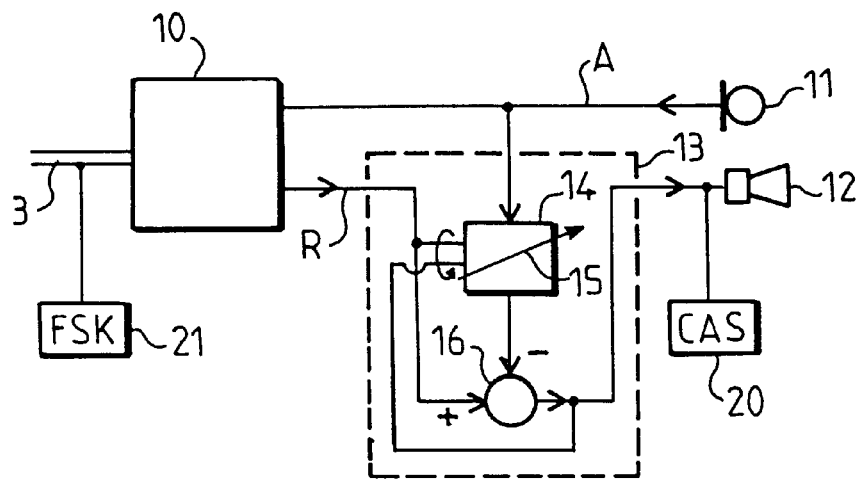
FIG. 2 gives a diagrammatic representation of a first embodiment of telephony equipment according to the invention.
Figure 3:
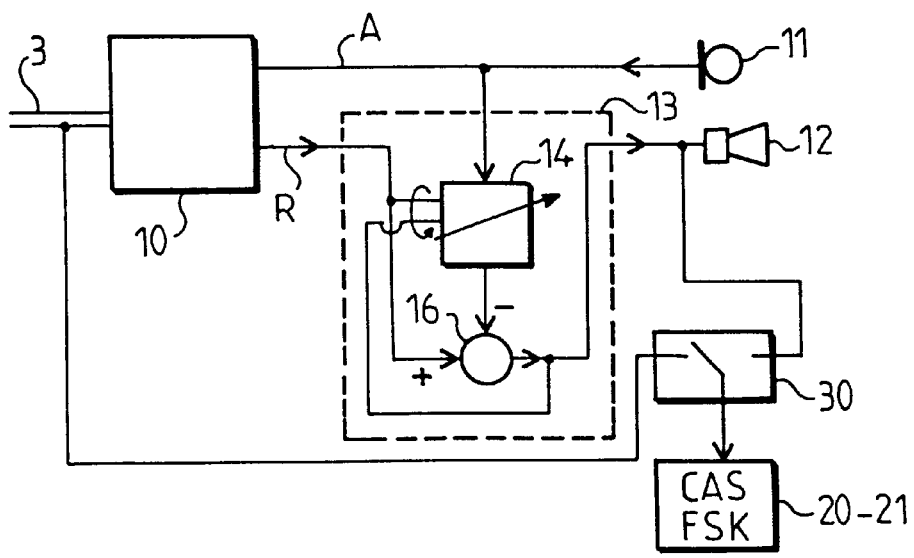
FIG. 3 shows a second embodiment of telephony equipment according to the invention.

The FIGS. 1 to 3 are diagrams on which only the elements necessary for understanding the invention are represented. According to FIG. 2, a telephone according to the invention comprises a 2-wire/4-wire converter 10 which is coupled, on the one hand, to a microphone 11 by an outgoing transmission channel A and, on the other hand, to a loudspeaker 12 by a return transmission channel R. The microphone R forms the input of the telephone; it is intended to receive useful signals which are voice signals. The loudspeaker 12 forms the output of the telephone; it is intended to produce useful signals which are voice signals. The telephone also includes an echo canceller 13 represented in the diagram by an adaptive filter 14. This adaptive filter generates a replica of the echo present on the return channel R based on data obtained on the outgoing channel A. A subtracter element 16 subtracts the echo replica of the signal produced by the converter 10. The adaptive filter 14 is controlled while the signal obtained on the return channel R is taken into account and the signal obtained on the output of the echo canceller 13, to provide maximum cancellation of the echo signal on the output of the subtracter element 16.

A detector 20 for detecting CAS signals is connected between the echo canceller 13 and the loudspeaker 12. And a detector 21 for detecting FSK signals is connected to the telephone line.

This embodiment is applied in all the countries where the CAS signals are not used when the telephone is off-line. It will be noted that the detection of FSK signals does not cause the same problems as the detection of CAS signals because the audio channels are cut off during the FSK transmission (no voice signal will thus be added to the useful signal). It is thus possible to connect the FSK signal detector directly to the telephone line, which makes it possible for the detector to be operational when the telephone is off-line (actually, in this case the useful signal is to be tapped upstream of the 2-wire/4-wire converter which is not supplied with power and thus does not operate).

In FIG. 3 is shown a further embodiment of a telephone according to the invention, applicable when the detection of CAS signals off-line is used.

In this embodiment, a switch 30 is inserted between the telephone line 3 and the output of the echo canceller 13. When the telephone is on-line, this switch 30 connects the detector of CAS signals to the output of the echo canceller 13. When the telephone is off-line, the switch connects the telephone to the telephone line 3, making it possible in this way both to detect CAS signals and to detect whether the telephone is on-line or off-line.

In this embodiment, the FSK signal detector is advantageously integrated with the CAS signal detector.

The echo canceller 13 and the detectors of signals CAS and FSK are, for example, formed on the basis of a circuit PCD 5091 manufactured by Philips Semiconductors.

The techniques of echo cancellation are well known to a person of ordinary skill in the art. With respect hereto, reference may be made, for example, to the article entitled "An Adaptive-Step Sign Algorithm for Fast Convergence of a Data Echo Canceller" published in IEEE Transactions on Communications, vol. COM-35, no. 10, October 1987.

What is claimed is:

1. Telephony equipment comprising:
   an input for receiving useful signals to be transmitted on an outgoing transmission channel,
   an output for delivering useful signals received on a return transmission channel to an output device, said outgoing and incoming transmission channels being coupled to a telephone line by coupling means,
   a service signal detector for detecting service signals transmitted by a telephone exchange on the telephone line and which may be superposed on useful signals, and
   an echo canceller for cancelling the echo of useful signals coming from said input which come back on said output, the service signal detector being connected between the echo canceller and said output at least when the telephony equipment is on-line so that said output device is connected both to said service signal detector and to an output of said echo canceller.

2. Telephony equipment as claimed in claim 1, further comprising a switch for connecting the service signal detector either between the echo canceller and the output when the equipment is on-line, or to the telephone line when the telephony equipment is off-line.

3. Telephony equipment as claimed in claim 2, wherein the service signal detector comprises a CAS signal detector (Call Alert Signal) notably defined in Recommendation ETS 300 778-1 by the ETSI.

4. Telephony equipment as claimed in claim 3, wherein the service signal detector comprises an FSK signal detector notably defined in Recommendation ETSI 300 778-1 by the ETSI.

5. Telephony equipment as claimed in claim 1, wherein the service signal detector comprises a CAS signal detector (Call Alert Signal) notably defined in Recommendation ETS 300 778-1 by the ETSI.

6. Telephony equipment as claimed in claim 5, further comprising an PSK signal detector notably defined in Recommendation ETST 300 778-1 by the ETSI connected to the telephone line.

7. A communication device comprising:
   a converter having a first input which is connected to a communication channel for communicating with a network;
   an input device connected to a second input of said converter for providing input signals to said converter;
   an echo canceller which receives said input signals to form a replica of echo present in output signals from said converter for cancelling said echo and forming modified output signals;
   an output device connected to an output of said echo canceller for receiving said modified output signals; and
   a service signal detector connected to said output of said echo canceller so that said output device is connected both to said service signal detector and to said output of said echo canceller.

8. The communication device of claim 7, further comprising an FSK signal detector connected to said first input of said converter.

9. The communication device of claim 7, wherein said service signal detector includes an FSK signal detector.

10. The communication device of claim 9, further comprising a switch inserted between said first input of said converter and said output of said echo canceller; said switch having a first configuration for connecting said service signal detector to said echo canceller, and a second configuration for connecting said FSK signal detector to said first input of said converter.

11. A method for detecting a service signal comprising:
    providing said service signal on a first input of a converter;
    providing an input signal to a second input of said converter;
    forming from said input signal a replica of echo present in an output signal from said converter;
    cancelling said echo by an echo canceller to form a modified output signal;
    providing said modified output signal to an output device and to a service signal detector so that said output device is connected both to said service signal detector and to an output of said echo canceller.

* * * * *